United States Patent [19]

Clack

[11] Patent Number: 5,560,393

[45] Date of Patent: Oct. 1, 1996

[54] SELF-CONTAINED, PURIFIED DRINKING WATER REFRIGERATOR STORAGE APPARATUS

[75] Inventor: Robert A. Clack, Madison, Wis.

[73] Assignee: Clack Corporation, Windsor, Wis.

[21] Appl. No.: 470,983

[22] Filed: Jun. 6, 1995

Related U.S. Application Data

[62] Division of Ser. No. 164,216, Dec. 9, 1993, Pat. No. 5,454,944, which is a division of Ser. No. 764,890, Sep. 24, 1991, Pat. No. 5,290,442.

[51] Int. Cl.[6] .................................................. B01D 27/14
[52] U.S. Cl. ................... 137/562; 210/257.1; 210/257.2
[58] Field of Search ......................... 137/562; 210/257.1, 210/257.2, 264, 266, 282

[56] References Cited

U.S. PATENT DOCUMENTS

| | | | |
|---|---|---|---|
| 3,565,112 | 2/1971 | Sides | 137/562 X |
| 3,616,921 | 11/1971 | Bray | 210/195 |
| 3,747,763 | 7/1973 | Kain | 210/181 |
| 4,054,526 | 10/1977 | Muller | 210/245 |
| 4,110,219 | 8/1978 | Maples | 210/245 |
| 4,143,795 | 3/1979 | Casebier | 222/143 |
| 4,161,445 | 7/1979 | Coillet | 210/181 |
| 4,181,243 | 1/1980 | Frahm | 222/189 |
| 4,491,520 | 1/1985 | Jaye | 210/232 |
| 4,496,906 | 1/1985 | Clack | 324/439 |
| 4,609,466 | 9/1986 | McCausland et al. | 210/257.2 |
| 4,713,175 | 12/1987 | Bray | 210/259 |
| 4,749,484 | 6/1988 | Greenhut | 210/266 |
| 4,752,389 | 6/1988 | Burrows | 210/181 |
| 4,759,844 | 7/1988 | Lipschultz et al. | 210/257.2 |
| 4,770,770 | 9/1988 | Regunathan et al. | 210/102 |
| 4,773,991 | 9/1988 | Aid | 210/96.2 |
| 4,800,018 | 1/1989 | Moser | 210/266 |
| 4,806,912 | 2/1989 | Clack | 340/603 |
| 4,842,724 | 6/1989 | Bray et al. | 210/104 |
| 4,853,117 | 8/1989 | Burrows | 210/110 |
| 4,871,452 | 10/1989 | Kohler | 210/167 |
| 4,881,661 | 11/1989 | Jones | 222/67 |
| 4,923,091 | 5/1990 | Sutera | 222/67 |
| 4,936,984 | 6/1990 | Blandford et al. | 210/250 |
| 4,957,624 | 9/1990 | Peranio | 210/257.1 |
| 5,173,192 | 12/1992 | Shalev | 210/244 |

OTHER PUBLICATIONS

Sears Owners Manual–Model No. 625.345100 Countertop Reverse Osmosis Home Drinking Water System, Chicago, IL, Date Unknown.

Primary Examiner—John Rivell
Attorney, Agent, or Firm—Lockwood, Alex, Fitzgibbon & Cummings

[57] ABSTRACT

A new and improved self-contained, portable, treated drinking water, refrigerator storage jug assembly is provided. The jug assembly includes a storage jug configured to be placed in a refrigerator. A water treating subassembly is mounted to the back of the storage jug and is placed in the refrigerator together with the jug. A fluid connector for connecting the portable jug and water treating subassembly to a kitchen sink for refilling is provided. In a preferred embodiment, the water treating subassembly includes a plurality of water treating modules interconnected to each other. Also in the preferred embodiment, a modular, leak-free flow block connector and a treatment module monitoring device form a part of the overall jug apparatus.

12 Claims, 5 Drawing Sheets

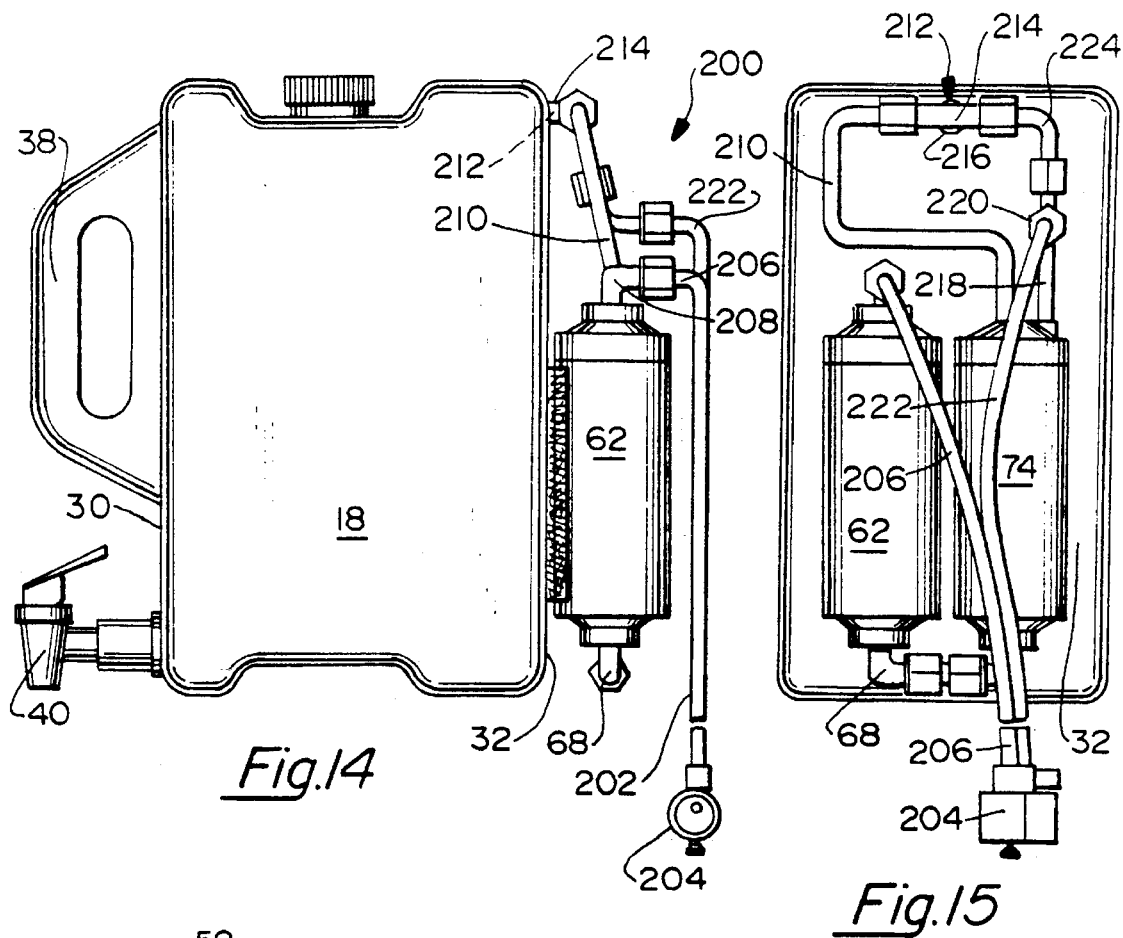
Fig. 14
Fig. 15
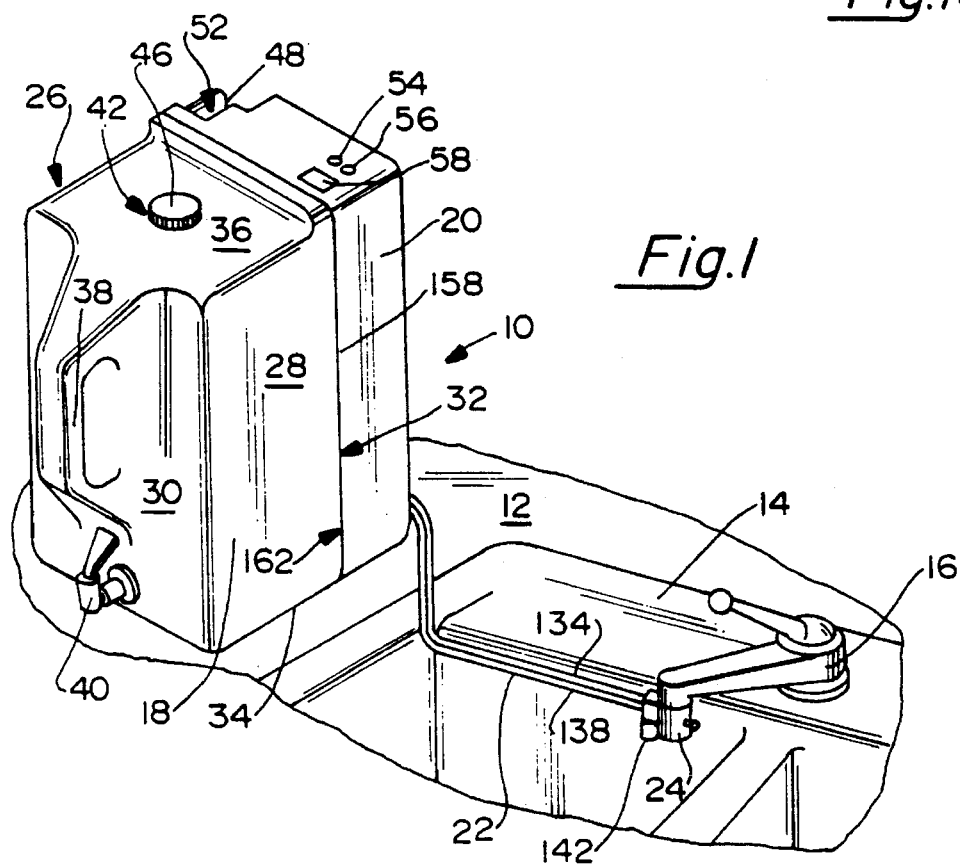
Fig. 1

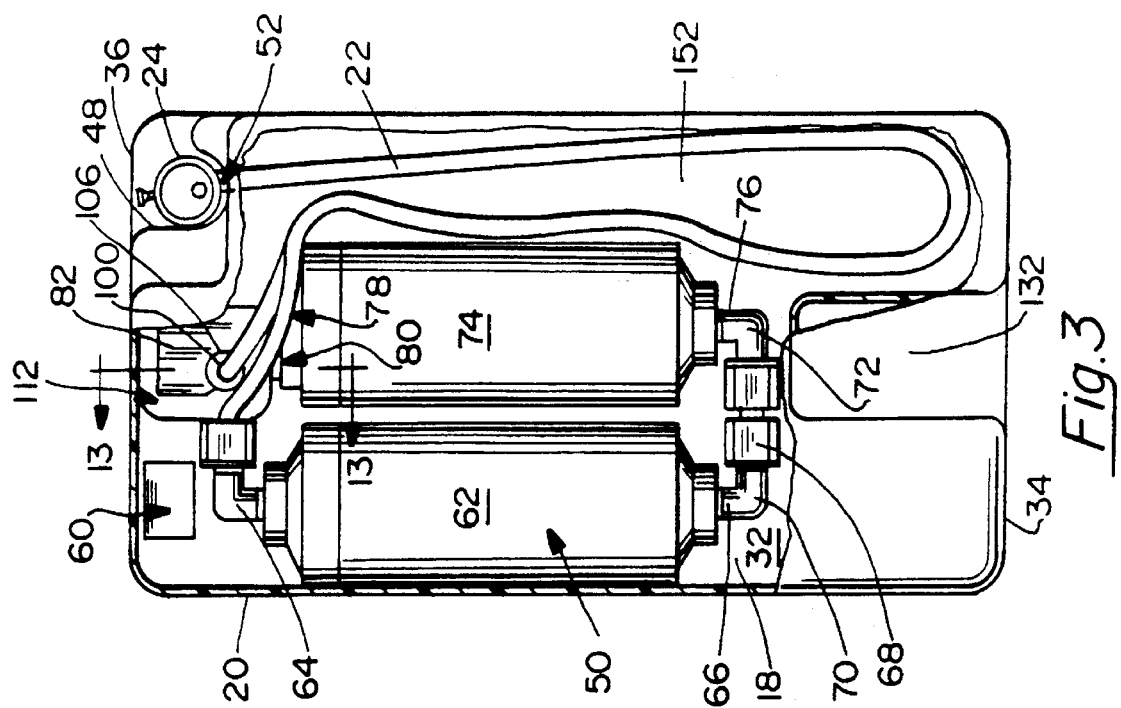
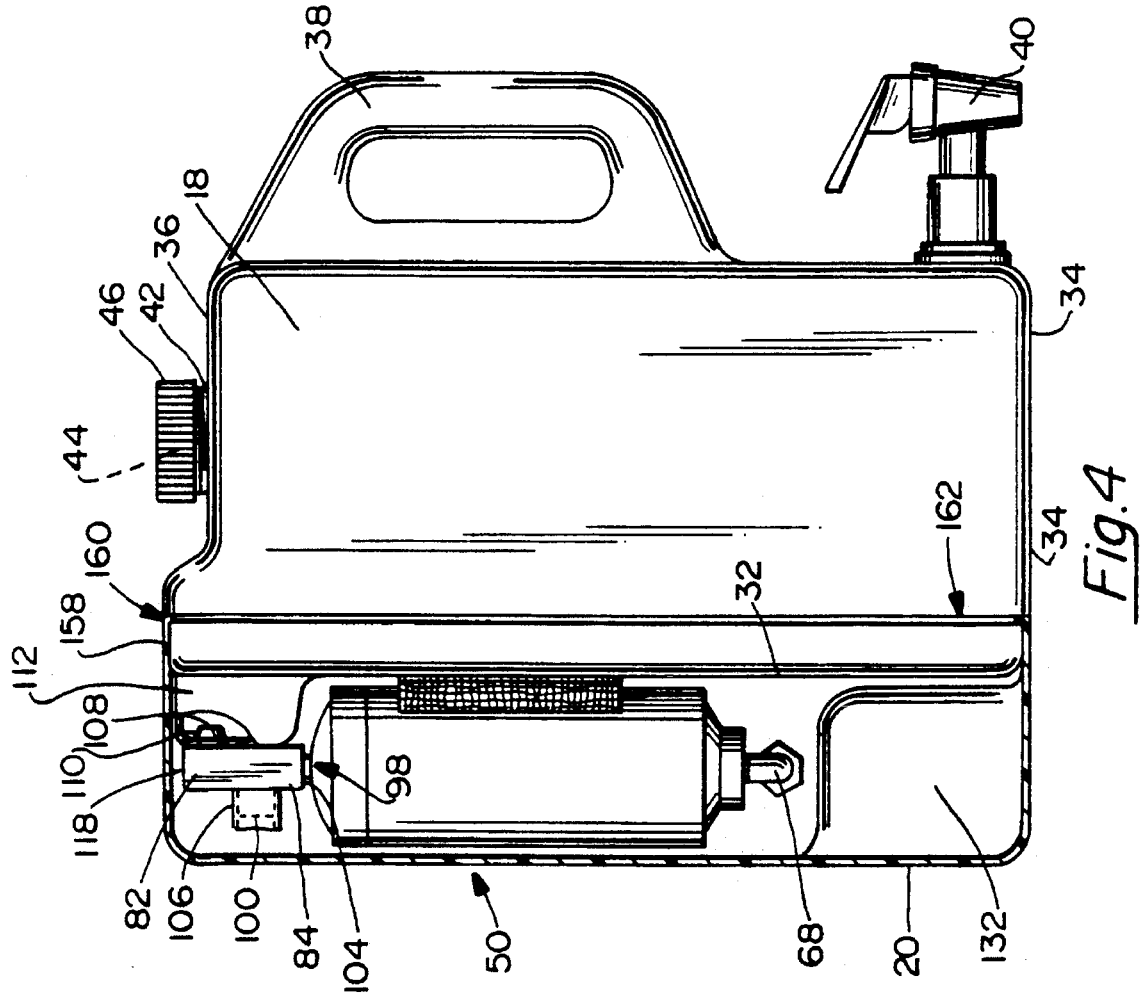

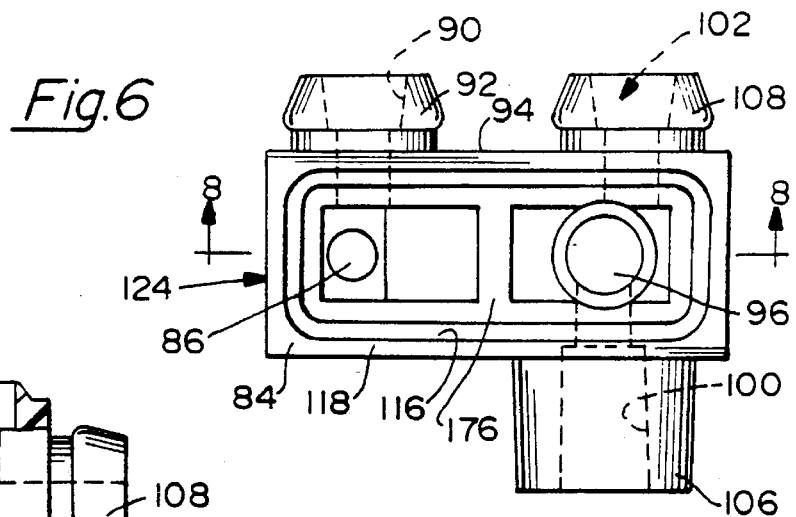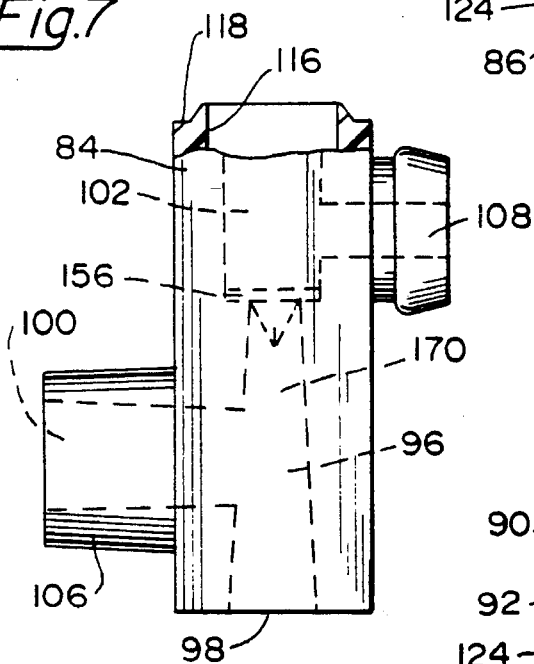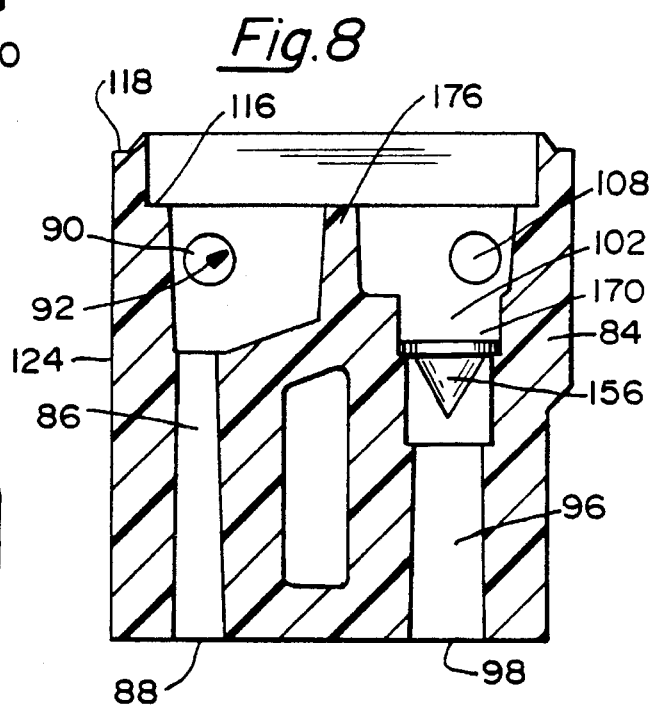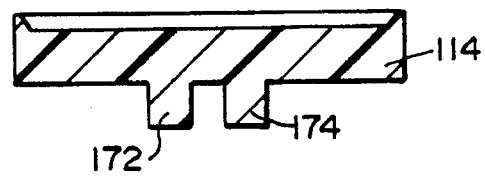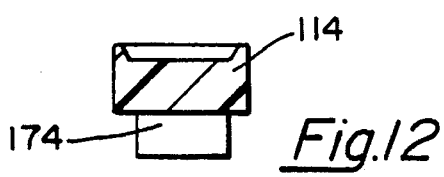

SELF-CONTAINED, PURIFIED DRINKING WATER REFRIGERATOR STORAGE APPARATUS

This application is a divisional of prior application Ser. No. 08/164,216, filed Dec. 9, 1993, now U.S. Pat. No. 5,454,944, which is a divisional of prior application Ser. No. 07/764,890, filed Sep. 24, 1991 now U.S. Pat. No. 5,290,442.

BACKGROUND OF THE INVENTION

The present invention generally relates to devices and methods for providing purified or specially treated drinking water from relatively less pure tap water sources. More particularly, it relates to a new and improved portable self-contained water treatment and jug storage apparatus including a refrigerator storage jug having water treating and connector elements mounted thereon which may be placed on a countertop adjacent a household sink to be filled/refilled with purified drinking water and thereafter the jug may be disconnected and placed in a refrigerator to dispense chilled drinking water in use.

Consumer awareness about drinking water quality has greatly increased in recent years, since the creation of the E.P.A. and the growth in environmental studies and ecology. Consumers today are concerned about the safety of their municipal and well water supplies. Accordingly, many consumers have begun purchasing bottled water for drinking, typically in the form of one gallon throw-away plastic jugs sold at supermarkets. In addition to being cumbersome and somewhat expensive, the residual throw-away jugs undesirably increase non-biodegradable solid waste needing disposal in already over-burdened municipal landfills. A reusable and/or refillable jug system would be preferable for many reasons.

Concurrently, the development of products for various water treating systems has also greatly increased in recent years. Special filters or treatment modules often including mechanical or chemical removal media are now known for selectively removing one or more impurities from a flow of source water to be treated. Activated charcoal filters, sediment filters, microfilters for removal of bacteria, and the like have become common-place. Reverse osmosis (R.O.) membrane filters for reducing the total dissolved solids content of water are also well known. Ceramic filters and specialty filters for removing lead, iron, nitrates, sulfates and/or other targeted impurities are commercially available. Treatment modules for adding nutrients such as fluoride, calcium and/or vitamins may also be available in standardized filter module or filter cartridge sizes and shapes for plug-in connections to a number of household water treating systems.

Prior art water filtration purification systems, particularly those including a R.O. filter element, typically are rather cumbersome systems adapted for under the sink mounting and installation. Special hardware and plumbing connections are needed for installing, maintaining or servicing these systems. Moreover, a skilled technician or plumber/contractor is usually required for initial installation and maintenance.

More recently, countertop R.O. water filtration purification systems have been developed. The countertop R.O. systems are mounted on a countertop surface adjacent a kitchen sink with various tubing and hose connections extending between the sink faucet and the filter unit and between the filter unit and the sink drain. The R.O. membrane filters make purified product water at a slow rate so that direct dispensing of purified R.O. water from a tap water supply is generally not possible or practical. As a result, the R.O. system is permitted to operate over an extended time period and the product water made is stored in tanks or storage vessels for dispensing. The storage vessels are generally large enough to hold more than a gallon of water and accordingly, the vessels and countertop arrangements frequently occupy a large amount of counter space adjacent the sink, where space is usually at premium.

Illustrative prior art countertop R.O. systems are described in U.S. Pat. No. 4,110,219 to Maples; U.S. Pat. No. 4,759,844 to Lipschultz et al; and U.S. Pat. No. 4,842,724 to Bray et al. The Maples arrangement includes a disconnectable storage container for purified water which may be placed in a refrigerator. The base of the device is adapted to remain beside the sink which takes up space. The Lipschultz et al. device also includes an enlarged base holding various filter elements and an upper reservoir portion which does not appear to be removable. The Bray et al. device includes an enlarged pump driven microfilter base unit and a pair of detachable container bottles. Instead of providing a sink and drain connection to supply tap water to be purified, one of the container bottles must be filled by hand and placed on the stand to provide source water. This latter arrangement would not be suited for R.O. filtration systems because, in R.O. systems, large quantities of tap water are used to make small quantities of purified R.O. drinking water. Accordingly, in the Bray et al. device one container would have to be about 3–5 times larger than the other purified water container which is impractical. Moreover, a self-contained unit would mean that repeated disconnection of a storage vessel from a treatment system could be avoided, thereby decreasing the risk or likelihood of bacterial contamination.

In order to overcome the shortcomings of the prior art devices, it is an object of the present invention to provide a new and improved apparatus for providing a refillable supply of purified drinking water for self-contained storage in a refrigerator.

It is another object of the present invention to provide a new and improved countertop R.O. filtration purification system which may be completely removed from the countertop as a unit and placed in a refrigerator without additional water transfer steps being required.

It is a further object of the present invention to provide a portable and refrigeratable R.O. filtration/storage jug device, so that a consumer can have purified drinking water wherever they may be, in different rental units, on vacation or the like.

It is still another object of the present invention to provide a self-contained refrigerator R.O. jug and filter apparatus having quick connect/disconnect features for attachment to a household sink supply of tap water.

It is a further object of the present invention to provide a self-contained refrigerator R.O. jug and filter apparatus including a filter performance monitor to signal when the useful life of the filter section elements has expired.

It is still another object of the present invention to provide a new and improved stand-alone refrigerator R.O. jug and water treatment system apparatus including a fluid flow control manifold for making mounted, organized and substantially leak free connections between the filter section and the storage jug for improved management and handling.

SUMMARY OF THE INVENTION

In accordance with these and other objects, the present invention provides a new and improved apparatus for providing a portable, refillable supply of treated drinking water for self-contained refrigerator storage. The new and improved apparatus of this invention comprises a refrigerator storage jug assembly including a storage jug and a water treatment subassembly mounted to said storage jug. The storage jug is preferably a hollow storage vessel made from a moldable thermoplastic material. The storage jug preferably is provided with a front handle projecting from a front face thereof and a treated water dispenser spigot located at a lower portion of the front face. A twist-on cap and cap-receiving threaded tubular top opening projection may be provided in a top surface of the jug to facilitate venting, cleaning, rinsing and emptying the interior volume of the jug. The storage jug further includes a treated water entry port through which purified or treated water may be introduced from the treatment subassembly into the container or jug for collection, storage and dispensing. Preferably, the jug also is provided with an anti-overfill port adjacent a top wall of the vessel. The anti-overfill port permits air to escape as the jug is filling in a refilling operation and also prevents over-filling of the storage jug by permitting additional water added to a previously-filled jug to overflow in a controlled manner to a drain. The preferred storage jug for use herein should be transparent or sufficiently translucent to permit the level of purified or treated water contained therein to be readily observable upon viewing the outside of the jug.

In accordance with this invention, the refrigerator storage jug assembly additionally comprises a water treatment subassembly. The water treating subassembly includes one or more water treatment modules or cartridges interconnected to each other. The water treatment modules can include commercially available modules or cartridges with mechanical or chemical removal media adapted to selectively remove one or more specific impurities from a stream of tap water caused to flow therethrough. The water treatment modules may also include disinfectant modules and/or nutrient addition-type modules for adding specific nutrients or additives such as vitamins, fluoride and/or calcium into water for drinking. Combinations of removal modules, disinfection modules and nutrient addition modules may also be used.

Typically, each treatment module includes a modular housing enclosing an internal filter or treatment element having input and output sites. Especially preferably, the water treating subassembly includes a reverse osmosis filter module for reducing contaminants and the total dissolved solids content of water for improved drinking water potability and taste. The water treating subassembly including the at least one water treating module (or more than one treatment module fluidly interconnected with each other as desired) generally has an associated input side, such as an entry port defined on a treatment module. The input port on the subassembly module is connectable to a source of untreated tap water at line pressure. The treatment subassembly also has an associated output side for discharging a stream of treated product water and usually also a stream of waste water.

Although fluid flow connections for the subassembly may vary depending on the type, number and order of the various treatment modules making up the treatment subassembly, the overall subassembly may be seen as taking in a stream of impure or untreated tap water, treating the stream in some manner and in so doing thereby subdividing the stream into a waste water stream component and a purified or treated water stream component. Alternatively, the subassembly may be made up entirely of in-line treatment modules which do not split the stream as it is being treated but instead permit water to flow from one module to the next successively reducing and/or removing undesired solids, salts, bacteria, etc. In this latter alternate arrangement, a waste water line is still required to catch any jug overflow. The use of a storage jug in a non-R.O., in-line systems permits the tap water to be exposed to the treatment medium for an extended period of time, as compared with direct dispense non-storage systems, to promote maximum contact time for optimum module or cartridge performance.

In accordance with this invention, the treatment subassembly is mounted to said storage jug to form the jug assembly. The mounting means employed may include adhesive, clamping or other affixation methods. Preferably, the subassembly is releasably mounted to said jug to permit modules within the subassembly to be altered, removed for service, and/or replaced by the same or different modules. A preferred means for releasably mounting the subassembly to the jug to form the jug assembly comprises hook and loop fastener strips adhesively bonded to the jug and the individual treatment modules, respectively, which may be cooperatively inter-engaged in a known manner to thereby mount the subassembly onto the jug body.

The new and improved apparatus of the invention also includes various fluid flow connections for joining various parts of the assembly to external system elements. More particularly, the apparatus includes means for connecting the treated product water stream component being discharged by the treatment subassembly generally to the storage jug and to the treated water entry port of the storage jug, in particular. Means are also provided in the apparatus for connecting the input side of the subassembly to a household sink faucet or other source of incoming tap water at line pressure. A drainage connection for conveying the waste water stream component being discharged at the output side of the subassembly to a household drain, such as a sink drain, is also provided.

In accordance with the preferred embodiment, a new and improved flow control manifold is provided for making substantially leak-proof fluid flow connections between the output side of the water treatment subassembly, the storage jug and system drain. More particularly, in accordance with the preferred embodiment, the new and improved fluid flow manifold comprises a unitary manifold body including a treated product water channel having an inlet end and an outlet end. The outlet end of the treated product water channel is adapted to be disposed in fluid flow relation with the treated water entry port of the storage jug. The manifold body further includes a waste water channel having an inlet end and an outlet end. An overflow relief channel branches off from an intermediate section of the waste water channel. The overflow relief channel includes a check valve at one end to prevent the flow of waste water upwardly through the overflow relief channel into the storage jug and also includes an opposed overflow inlet end which is adapted to be dispersed in fluid flow relation with the anti-overfill port of the storage jug. Connecting means are provided for connecting the treated water and waste water streams at the output of the subassembly to the inlet ends of said product water channel and said waste water channel, respectively.

In accordance with this preferred embodiment incorporating the new and improved fluid flow control manifold device, connection between the tap water source, the treatment subassembly and the drain are preferably made by a length of double hose tubing having a dual diverter valve at one end. The flexible double hose or twin tubing connector includes a pair of parallel flexible thermoplastic tubular hose elements joined together in side by side configuration by an inter-connecting web of plastic adjoining the two hoses along the length thereof. One tube serves as a tap water inflow line and the other tube serves as a waste water and air/overfill water outflow line. A dual diverter valve of a known commercially available variety may be attached to one end of the double hose tubing. The dual diverter valve may then be selectively connected to a household sink faucet, either directly by threaded engagement of the diverter to the faucet, or by a quick connect/disconnect attachment feature on the diverter valve which can be mated with a complementary male adapter mounted on the end of the household faucet. The opposed ends of the double hose tubing are attached to the input side of the treatment subassembly and to the waste water outlet end of the flow manifold, respectively. The diverter valve, when in its attached condition, includes a spring biased valving rod movable between "on" and "off" positions. When the valve is in its attached condition on the faucet with the valving rod in its normally off position, the incoming tap water from the household faucet enters an upper chamber of the diverter valve and flows through an aperture to a lower exit chamber, so that tap water is discharged directly downwardly into the sink. In its on position, the valving rod blocks off the valve aperture between the upper chamber and the lower exit chamber of the diverter valve. In the on position, the valving rod unseals and opens another valve aperture which communicates with the inflow line of the double hose tubing. This causes substantially all of the incoming tap water to flow from the sink faucet through the diverter valve and into the in-flow line of the tubing or hose connector. The incoming impure tap water at line pressure flows along the in-flow line to the input side of water treating subassembly mounted on the storage jug. The waste water stream component travels from the outlet end of the waste water channel, along the waste water outflow line of the tubing connector and exits through a discharge opening defined on the diverter valve housing into the household sink and out the household sink drain.

In accordance with the preferred embodiment, the jug overflow and waste water streams are combined or merged in the flow manifold so that they may both exit out the single out flow line of the twin tubing or hose connector and dual diverter valve. As a result, the need for three tubing connectors usually required in the prior art is eliminated by the present jug apparatus. Moreover, the dual diverter valve employed in the twin tubing connector of this invention and the matable quick connect/disconnect adapter are commercially available parts readily installed by the consumer. This further avoids the need for special plumbing connections, tubes and specialty adapters employed in the prior art, requiring a skilled technician for startup, installation and/or repairs. The dual diverter valve and spring loaded valving rod close off the inflow line to the water treating subassembly in the normal off position to reduce the risk of contamination. In accordance with the preferred embodiment, the flow control manifold and the communicating twin tubing are mounted to port sites located at an upper portion of the storage jug to substantially reduce or eliminate dripping and/or syphoning from occurring with the present apparatus in connected and disconnected conditions.

Moreover, in accordance with the preferred embodiment, a monitoring means may be employed with the flow manifold to evaluate the relative effectiveness of the treatment subassembly by measuring a given property of the treated water flowing through the treated water channel of the flow manifold. For example, if the water treating subassembly is intended to remove salts or dissolved solids content from the tap water, a monitor for monitoring the salt or solids concentration in the treated water channel may be used. The monitor may visually or audibly indicate when the useful life of a water treating module in the subassembly has been reached or exceeded, notifying the owner that it is time to replace that module or cartridge. The entire storage jug assembly including the jug and treatment subassembly may be used for up to about two years or until the monitor indicates that the treatment subassembly has expired. Thereafter, the entire apparatus may be disposable, but preferably may be reconditioned for further use. In accordance with the preferred embodiment, the treated water channel of the flow manifold is provided with an enlarged chamber area. Monitor electrodes may be pierced through the manifold side wall for sealed-in-place, easy installation.

In accordance with this invention, the overall apparatus may be disconnected from the household tap water source and sink drain and may be moved as a self-contained unit onto a shelf in the refrigerator to provide a chilled supply of treated drinking water. The apparatus may be reconnected as necessary to refill the treated water supply in the jug. In accordance with an intended method of use, the apparatus is connected to a kitchen sink at night before going to bed and the tap water is turned on. The water treating subassembly preferably includes an R.O. filter treatment module which fills the storage jug with R.O. purified drinking water overnight. In the morning, the apparatus is disconnected from the sink and the entire apparatus is placed in the refrigerator for dispensing chilled drinking water throughout the day. As the effective rate of newer R.O. membrane cartridges improves, a 1–5 gallon jug may be filled in as short a time as 4–6 hours, so that the jug apparatus may be connected after dinner and disconnected before bedtime.

The new and improved apparatus of the invention saves valuable counter space during the day. A single twin tubing hose and diverter valve connection and attachment to a household kitchen sink and faucet provides only one opening to the water treating subassembly thereby reducing the possibility for contamination. When stored on a refrigerator shelf, a front facing handle and dispenser spigot allow for easy, convenient dispensing, even by small children, permitting them to help themselves. The new and improved fluid flow control manifold of the preferred embodiment provides five substantially leak-free connections in the overall apparatus, including three female-type and two male-type connections for improved reliability and convenience. The apparatus may preferably be provided with a rear cover adapted to enshroud and cover the water treating subassembly, when not in active use, to afford convenient hose storage and a "works in a drawer" arrangement for improved overall convenience. Unexpectedly, it has now been discovered that frequently refrigerating the water treatment modules mounted on the refrigerator jug in accordance with this invention increases the use lives of most treatment modules and discourages or reduces contamination by or growth of bacteria in the subassembly.

Other objects and advantages of the invention will become apparent from the following Detailed Description of the invention taken in conjunction with the Drawings in which:

BRIEF DESCRIPTION OF THE DRAWINGS

FIG. 1 is a perspective view of the new and improved self-contained portable purified drinking water refrigerator storage jug apparatus of the present invention shown in a being-filled condition with its hose connection attached to a common household kitchen sink faucet;

FIG. 3 is a rear elevation view of the new and improved refrigerator storage jug apparatus of the present invention partly in section with portions of the rear cover cut away to show the elements of the water treatment subassembly in a stored or stowed normal condition of use;

FIG. 4 is a side elevation view of the new and improved refrigerator storage jug assembly of this invention partly in section with portions of the rear cover and an upper rearwardly projecting mounting portion of the jug body cut away to show the elements of the water treating subassembly;

FIG. 6 is a top plan view of the fluid flow control block shown in FIG. 2;

FIG. 7 is an elevated side view, partly in section, of the fluid flow control block, of the preferred embodiment of the invention;

FIG. 8 is an elevated cross sectional view of a portion of the new and improved fluid flow control block of the preferred embodiment of the invention, taken along view lines 8—8 in FIG. 6, for making fluid flow connections between the storage jug, the water treatment subassembly, a source of household tap water at line pressure and a household or system drain;

FIG. 9 is a top plan view of the lid seal member to the fluid flow control block;

FIG. 10 is a bottom plan view of the lid seal member;

FIG. 11 is an elevated cross sectional view of the lid seal member, taken along view lines 11—11 in FIG. 10;

FIG. 12 is an elevated cross sectional view of the lid seal member taken along view lines 12—12 in FIG. 10;

FIG. 14 is a side elevation view of an alternate embodiment of the new and improved self-contained, portable purified drinking water refrigerator storage jug assembly in accordance with the invention with the rear cover deleted; and FIG. 15 is a rear elevation view of the alternate storage jug assembly shown in FIG. 14.

DETAILED DESCRIPTION OF THE PREFERRED EMBODIMENTS

Figure 2:
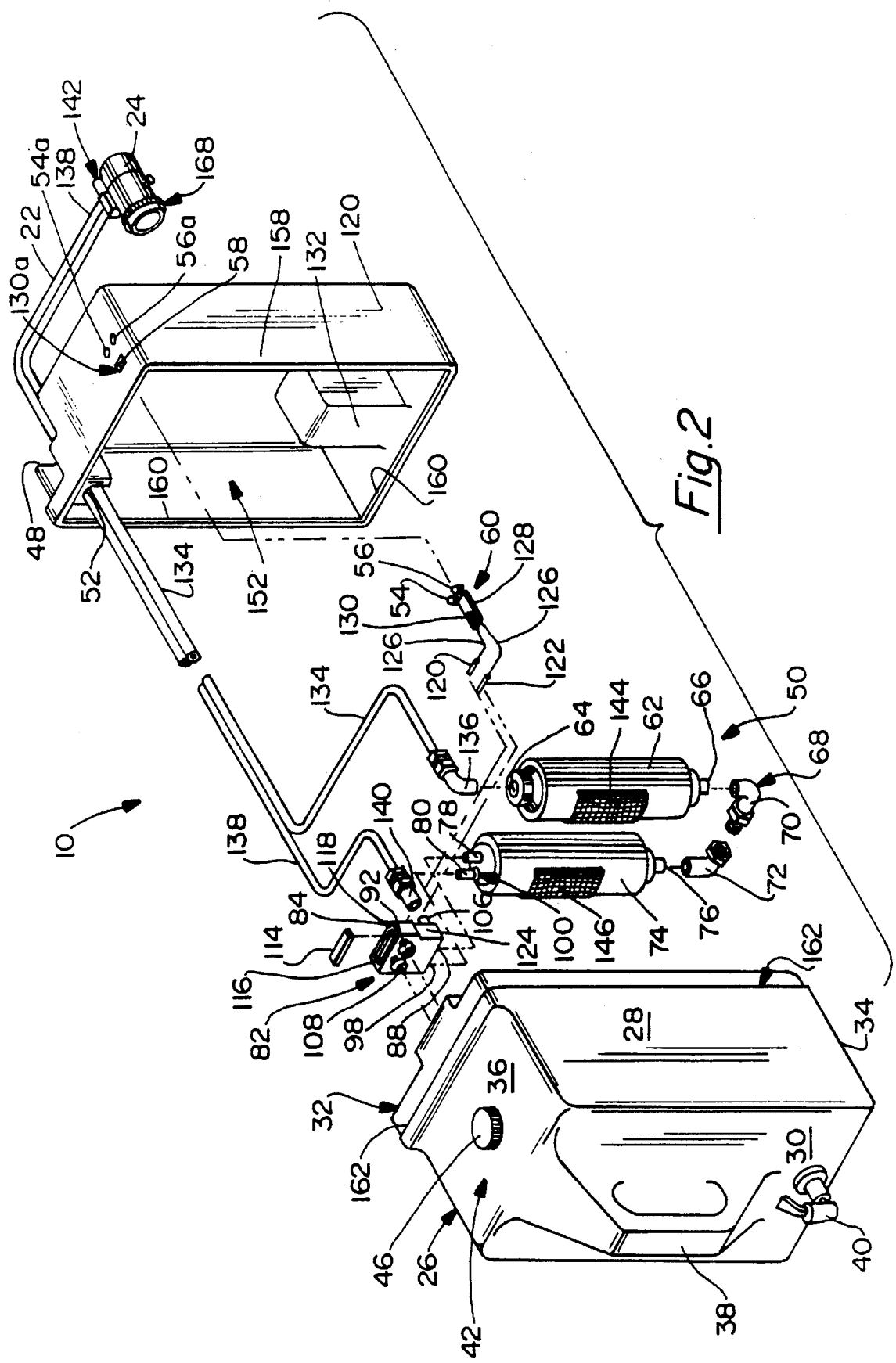
FIG. 2 is an exploded perspective view of the new and improved self-contained, portable, purified drinking water refrigerator storage jug apparatus of the invention.

Referring now to FIG. 1, a preferred embodiment of the new and improved portable, self-contained, treated drinking water, refrigerator storage jug apparatus, generally referred to by reference numeral 10, is shown. As depicted therein, apparatus 10 is illustrated in a being-filled condition located on a kitchen counter top 12 adjacent a kitchen sink 14 equipped with a conventional household tap water faucet 16.

More particularly, apparatus 10 includes a storage jug 18, a rear or back cover 20, and a twin tubing hose connector 22 equipped with a dual diverter valve 24 for releasable attachment to kitchen faucet 16. Storage jug 18 includes a jug body having a generally rectangular configuration and defined by parallel, spaced-apart upstanding sidewalls 26, 28 and parallel, spaced apart upstanding front wall 30 and an opposed rear wall 32 as well as a base or bottom wall 34 and an opposed top wall 36. In accordance with the preferred embodiment, an integrally-molded, forwardly projecting handle 38 extends downwardly from front wall 20. A treated drinking water dispense spigot 40 located at the central lower portion of front wall 20 is provided to dispense chilled, refrigerated treated drinking water from the interior of jug 18 in use. An upwardly extending tubular lip projection 42 extends upwardly from top wall 36 to define a recloseable top opening 44. External threads provided on the outer surface of top lip projection 42 are adapted to threadably, matably engage internal threads provided on a top cap member 46 as shown. The recloseable top opening 44 is provided to permit easy access to the interior volume of the jug for rinsing, cleaning or other purposes.

Rear or back cover 20 encloses the water treating subassembly generally referred to by reference numeral 50, which, in accordance with the present invention, is mounted to rear wall 32 of the storage jug 18. The rear or back cover 20 is releasably affixed to the rear surface portions of the jug body 18. In accordance with the preferred embodiment shown in FIG. 1, the rear or back cover 20 includes a tubing adapter groove receptacle portion 48 sized and shaped to receive and support the dual diverter valve 24 of the twin tubing hose connector 22 when not in use. The twin tubing hose 22 extends through an aperture or opening 52 (FIG. 2) in the rear or back cover 20 so disclosed in the groove receptacle portion 48. Hose connector 22 extends outwardly of rear cover 20 for attachment of the apparatus 10 to the household sink 14 and faucet 16 as shown. Also as shown in the preferred embodiment in FIG. 1, a pair of color coded diode lights 54 and 56 and a power switch 58 are provided in the top righthand portion of back cover to permit a monitoring assembly 60 (FIG. 2) to perform a test to check on the reliability or operation of the water treating subassembly elements.

In accordance with the present invention, the new and improved apparatus 10 may be conveniently placed adjacent a kitchen sink 14 for filling with treated drinking water made from household tap water until the jug 18 is substantially filled. Thereafter, apparatus 10 may conveniently be disconnected from the kitchen faucet 16, preferably by means of a quick-disconnect attachment feature on diverter valve 24. The hose connector can be inserted into its storage location defined within the back cover. The dual diverter valve 24 may be stored in grooved receptacle portion 48. The entire apparatus 10 may then be gripped by the front handle 38 and placed in a refrigerator to provide a chilled, treated drinking water supply for use as desired. Placement of the water treatment subassembly in the refrigerator has been found to increase the effective use lives of the water treating elements within the subassembly 50 and to retard, reduce or substantially eliminate bacteriological growth within the water treating and storage apparatus 10.

In greater detail now and referring to the exploded perspective view of the preferred embodiment shown in FIG. 2, the water treating subassembly 50 is shown in greater detail. As depicted in FIG. 2 the water treating subassembly 50 includes a pair of filter modules, including an activated carbon filter module 62 having an inlet port 64 at one end for receiving impure tap water at line pressure and a carbon-purified water outlet port 66 at the opposed lower end. A U-shaped bridging connector 68 comprising a double ended pipe connector or a connector formed from a pair of elbows 70, 72 connects the carbon-purified output port 66 of the first activated charcoal filter module 62 to the inlet port 76 of a reverse osmosis filter module 74. At the opposed top portion, the R.O. module 74 includes an R.O. purified-water outlet port 78 and an adjacent waste water outlet port 80 as shown. Each of the treatment modules 62 and 74 includes a modular housing enclosing an internal filter or treatment element. Although a granular activated carbon filter module 62 and reverse osmosis module 74 are depicted in the preferred embodiment shown in FIG. 2, any combination of water treating modules may be used as desired.

In accordance with the preferred embodiment depicted in FIG. 2, the water treating subassembly 50 is fluidly connected to the refrigerator storage jug 18 and to other elements of the water flow system (14, 16) preferably by means of a new and improved flow control manifold 82. Flow control manifold 82 comprises an integral, unitary thermoplastic elastomeric molding. Preferably, the improved fluid flow manifold 82 comprises a unitary manifold body 84 including a treated product water channel 56 defined and extending therein having an inlet end 88 and an outlet end 90. The outlet end of the treated product water channel 86 is defined by a treated water exit port 92 which projects outwardly from a major surface of the manifold body 84. The manifold body 84 further includes a waste water channel 96 having an inlet end 98 and an outlet end 100 as well as an overflow relief channel 102 branching from the waste water channel 96 between its inlet end 98 and an outlet end 100 at a point intermediate the length thereof. The waste water channel 96 has its inlet end disposed in the lower edge portion 104 of the manifold body 84 and has its outlet end 100 defined in a forwardly projecting waste water outlet port 106 as shown in FIG. 2. The overflow relief channel 102 includes a specially configured overflow inlet port end 108 adjacent the purified or treated product water outlet port 92, also extending from the major surface 94 of the manifold body 84. Both the purified-water outlet port 92 and the overflow inlet port 108 have a flared bullet-nosed configuration which is adapted to be wedgingly resiliently and sealingly engaged in a pair of circular aperture openings 110 (FIG. 4) provided in an upper mounting projecting portion 112 provided in the upper part of rear wall 32 of storage jug 18.

As shown in FIG. 2, the fluid flow manifold 82 additionally includes a lid seal member 114 adapted to be telescopically received in a lid seal groove 116 defined within the top surface 118 of the manifold body 84. Lid seal 114 is sealably secured to the manifold body 84 for use by any suitable thermoplastic welding method, such as ultrasonic welding or friction welding methods and preferably by hot plate bonding methods. The lid seal 114 is generally required to be manufactured as a separate molded part which is thereafter assembled and fused with the lower body portion 84 because of the intricate mold required to produce the manifold body 84 and to permit press-fit sealed installation of check valve 156. Alternatively, the check valve may be integrally molded into body 84 during the molding operation, followed by a post forming slitting operation to provide the check valve 156.

In accordance with the preferred embodiment, a thermoplastic elastomer is used for making the manifold body 84 and lid seal members 114 which should have a frictional affinity for the inlet and outlet ports defined on the water treating modules, such as the R.O. purified-water outlet port 78 and the waste water outlet port 80 on the R.O. module 74, as shown. In accordance with the preferred embodiment depicted in FIG. 2, the manifold body 84 will be pressed onto the top surface of the R.O. filter module 74 so that the purified-water outlet port 78 and the waste water outlet port 80 are telescopically received in a resilient frictional fit and sealed engagement within the inlet end 88 of the treated water channel 86 and the inlet 98 end of the waste water channel 96 within the manifold body 84. In accordance with the preferred embodiment, the manifold body 84 and its sealing lid member 114 are molded from a SANTOPRENE® brand thermoplastic elastomer composition comprising an alloyed blend of rubber with polypropylene.

In accordance with the preferred embodiment depicted in FIG. 2 the new and improved apparatus 10 additionally preferably comprises a monitor means 60 for monitoring the operation of the water purification or water treatment subassembly 50. In accordance with this preferred embodiment, a pair of pin electrode members 120, 122 may be inserted through the sidewall 124 of the manifold body 84 into the treated product water channel 86 within the manifold 82. The pin electrodes 120, 122 are electrically connected by means of insulated wire leads 126 to a circuit substrate 128 containing electrical circuit elements for performing a monitoring function. A red and green diode element 54, 56 extend from the circuit substrate 128 as shown. The electrical monitoring device 60 as depicted in the preferred embodiment of FIG. 2 is of the type which is capable of performing an absolute or a relative conductivity measurement for the treated water flowing through the treated product water channel 86 of the manifold 82. The electrical monitoring device measures or compares the water conductivity sensed by the electrodes 120, 122 against a reference voltage until a pre-determined threshold has been reached. An output circuit on the circuit substrate 128 responsive to a given signal drives an appropriate one of two indicator lamps or diodes 54, 56 to indicate a satisfactory or unsatisfactory system operation. The overall circuit and monitoring device 60 may be run on a simple battery and may be energized by depressing a test switch 130 in the top of rear cover 20. Further details and description of suitable monitoring devices 60 for use herein are found in U.S. Pat. Nos. 4,496,906 and 4,806,912, which are each specifically incorporated herein by reference. A commercially available monitoring device is sold under the trade name RESILITE™, available from Clack Corporation, Windsor, Wis.

Also referring to FIG. 2, in the preferred embodiment, the rear cover member 20 is shown to include a pair of diode receiving apertures 54a, 56a and a depressible switch plate aperture 130a into which monitor assembly or device 60, may be mounted. In the preferred embodiment depicted in FIG. 2, a lower generally rectangular block projection 132 is defined in the rear cover 20 to provide for improved hose management as is best shown in FIG. 3. The upper, diverter valve receiving groove receptacle 48 includes a tube aperture 52 which permits the twin tubing of hose connector 22 to be slid into and out of the back cover 20 in use, for connecting the water treating subassembly 50 to a sink 14 or moving it to its stored position (FIG. 3) as desired. As shown in FIG. 2, the dual diverter valve 24 is attached to one end of the twin tubing hose connector 22 which includes an impure tap water line 134 which is connected by means of an elbow connector 136 onto the impure water inlet port 64 of the granular activated carbon filter module 62. A waste water outflow line 138 extends from a straight or an elbow coupling connector 140 mated with the rearwardly projecting waste water outflow port 106 on the manifold 82 and extends to the dual diverter valve waste discharge opening 142 for discharge to a system or sink 14 drain.

In accordance with the preferred embodiment of the invention shown in FIG. 2, the water treating subassembly 50 modules 62 and 74 are mounted to the rear wall 32 of the storage jug 18 to provide a portable self-contained apparatus 10. In accordance with this aspect of the invention, the granular activated carbon filter module 62 and the reverse osmosis filter module 74 are each provided with a hook-and-loop fastener strip 144. 146 which is adhesively bonded to the exterior surfaces thereof. These strips are positioned for engagement with complementary hook-and-loop fastener strips 148, 150 adhesively bonded to the rear outwardly facing surface of rear wall 32 of storage jug 18, as is best shown in FIG. 4.

Referring now to FIG. 3, the new and improved apparatus 10 is shown with hose connector 22 in its stored condition, as the apparatus 10 may be configured in use as stored on a refrigerator shelf. In this condition, the dual diverter valve 24 is resting in its groove receptacle portion 48 on the exterior of the rear cover 20 and the tubing connector 22 is maintained within a tubing storage, columnar space 152 defined to the righthand side of the R.O. module 74 and the hose management rectangular projection 132 defined in the rear end cover 20 as shown. This facilitates the ingress and egress of the hose 22 from the assembled water treatment assembly 10 in use. In addition to preventing hose foul-ups, this arrangement additionally prevents the hose from catching on the water treatment subassembly elements 62 and 74, possibly loosening them and contributing to a system leakage in use.

Referring now to FIG. 4, the upper rear mounting projection 112 extending from the upper portion of the rear wall 32 on jug body 18 and including apertures 110 for receiving the pure water port and the anti-overfill outlet port 108 is shown in the upper lefthand portion of the drawing. The flow control manifold body 84 is mounted to the mounting portion 112 by pressing the outwardly flaring bullet-nosed ports 96 and 108 on the manifold body 84 into their respective apertures 110 in the mounting portion 112 of the jug vessel 18 until a resilient sealing engagement is formed. Thereafter, the R.O. water treatment module 74 is press-fit into the inlet end 88 of the treated water product channel 86 and the inlet end 98 of the waste water channel 96 defined in lower edge 104 provide a sealed, wedging, retained engagement of the module within the flow control manifold 82, as is best shown in FIG. 13.

Figure 13:
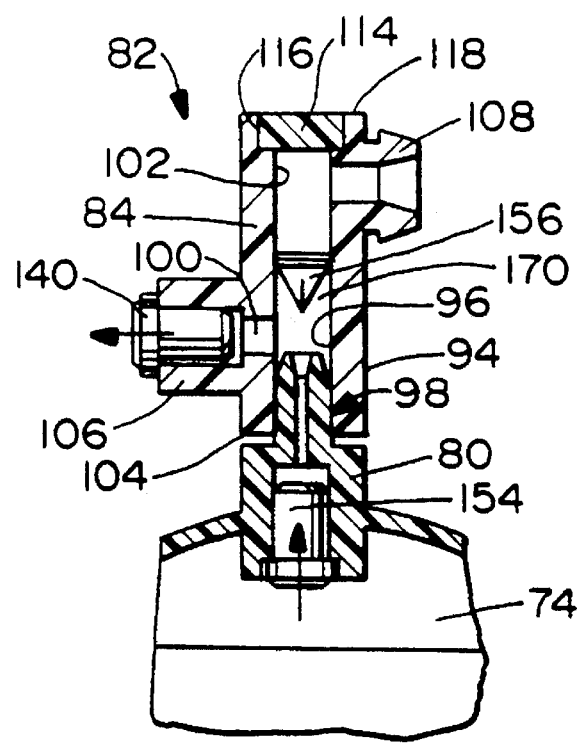
FIG. 13 is an elevated cross sectional view of the new and improved fluid flow control block of the preferred embodiment taken along view lines 13—13 in FIG. 3 shown in use and connected to a filter module and a waste water outlet line of the double hose tubing connector for conveying concentrated waste water from the water treatment subassembly to a sink or system drain, as well as air and overflow water from the jug.

Referring now to FIG. 13, the wedged engagement of the R.O. waste water outlet 80 of the R.O. module 74 within the waste water inlet port 98 of the manifold 82 is shown. The waste water outlet port 80 of the R.O. module 74 includes a drain restrictor element 154 built into the R.O. module 74 itself. The projecting outward port 80 is telescopically received within the inlet end 98 of the waste water channel 96 to provide a wedging press-fit engagement. The resilient thermoplastic elastomer material forming the flow control manifold 82 will flex outwardly to telescopically receive the projecting outlet port 80 and relax to grippingly sealably engage the side surfaces of the port 80 within the waste water channel end 98.

The waste water outlet port 80 is shown with a coupling connector 140 for the waste water line 138 of the twin tube hose connector 22. An L-shaped extension of the waste water channel 96 forming an overflow relief channel 102 extends in the upper portion of the manifold body 84 as depicted in FIG. 13. More particularly, the overflow relief channel 102 includes a profiled overflow inlet end 108 having the bullet-nosed configuration which is adapted to the wedgingly and sealingly engaged in the anti-overfill port 110 of the storage jug 18. The overflow inlet end 108 communicates by means of the overflow relief channel 102 to the waste water outlet; 96 within the manifold body 84. A duck-bill check valve 156 is disposed immediately adjacent the junction between the overflow relief channel 102 and the waste water channel 96 to effectively prevent waste water flowing in the waste water channel 96 from entering the storage jug 18. The duck-bill check valve 156 is a one-way valve which opens to permit air to escape and overflowing purified jug water to be released through the overflow relief channel 102 and out through the waste water channel 96 through the waste water line 138 of the tubing connector 22 to drain.

Referring again to FIG. 4, the filter modules 62, 74 of the water treatment subassembly 50 are shown mounted by means of cooperating hook-and-loop fastening strips 144, 148 and 146, 150 to the rear wall 32 of the storage jug 18 to provide a vertically aligned compact arrangement which may be neatly disposed within the rear cover member 20. The rear cover member 20 is press-fit onto the rear end of the storage jug 18 for mounting in use. As depicted in the preferred embodiment shown in FIG. 4, the margin 158 portion of the rear cover includes an inwardly directed peripheral lip 160 which is adapted to engage a complementary groove or recess 162 defined adjacent the rear wall 32 of the jug housing 18 as shown.

Figure 5:
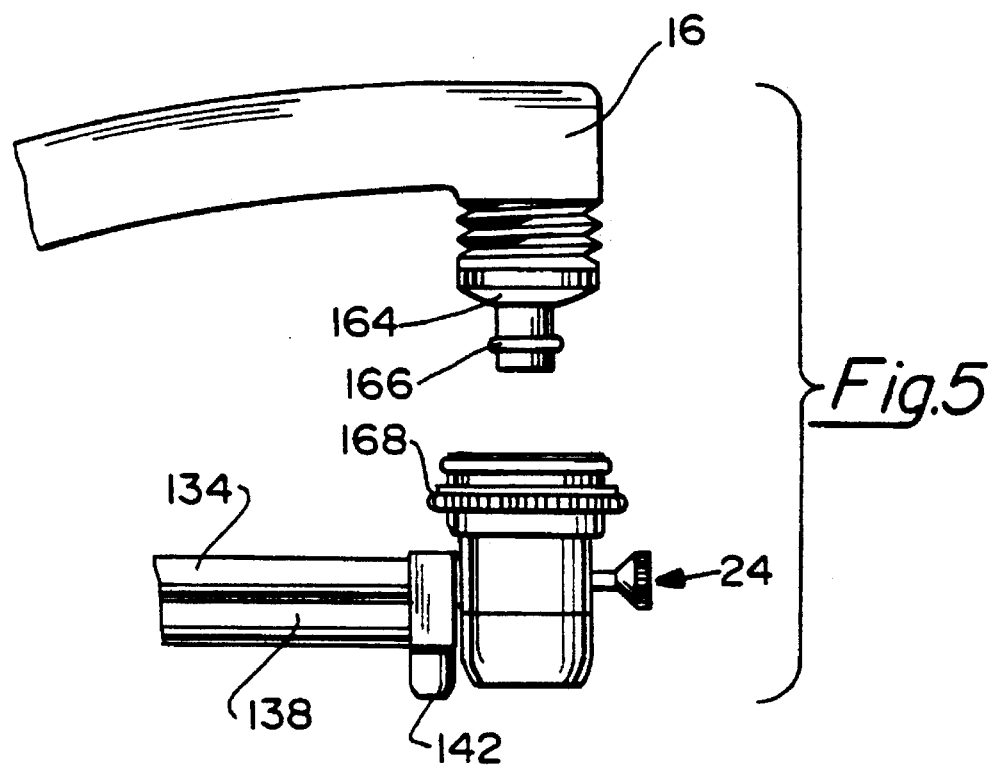
FIG. 5 is a side elevation view of the preferred matable, quick-disconnect sink faucet adapter and hose connector for connecting the new and improved portable, purified drinking water refrigerator storage jug to a household kitchen sink faucet for filling/refilling the jug portion with purified drinking water made by treating tap water in the water treatment subassembly of the apparatus.

Referring now to FIG. 5, and in accordance with the preferred embodiment of the invention, the opposed end of the twin tubing connector 22 is provided with a dual diverter valve 24 of a commercially available known type, which is preferably provided with quick-disconnect features for ease of attachment and release from a household kitchen sink faucet 16. As depicted in FIG. 5, a threaded male adapter member 164 may be easily screwed into the faucet 16 of a kitchen 14 sink which includes a detent ring 166 projecting therefrom. A spring loaded retaining collar 168 on the diverter valve 24 for a well-known ball detent type quick-disconnect assembly may be used to lock the diverter valve 24 in mounted position on the faucet 16 and male adapter 164 in use. All other quick-disconnect coupling types, other than ball detent type may also be used such as a bayonet type or simple threadable coupling nut engagement may also be used.

Referring now to FIGS. 6–13, the new and improved portable self-contained treated drinking water refrigerator storage apparatus 10 includes the fluid flow control manifold 82 as shown. The fluid flow control manifold 82 is provided for making fluid flow connections between the output side of the water treatment subassembly and the storage jug and the system drain. More particularly, the new and improved fluid flow control manifold depicted in this preferred embodiment includes the integral unitary molded manifold body 84 including the treated product water channel 86 having an inlet end 88 and an outlet end 90. The outlet end 90 of the treated product water channel 86 is configured to be disposed in sealed fluid flow relation with the treated water entry port 110 of the storage jug. The manifold body 84 further includes the right angle waste water channel 96 extending therein, having an inlet end 98 defined in the lower surface 104 of the manifold body 84 and an outlet end 100 defined in a tubular projecting structure 106 as shown. Moreover, an overflow relief channel 102 branching from the waste water channel 96 is provided within the manifold housing 84 as shown. The overflow relief channel 102 includes an overflow inlet port 108 which is configured to be sealably engaged in the anti-overfill port 110 of the storage jug 18. The duck-bill check valve 156 is provided to prevent contaminated waste water from entering the storage jug 18 through the anti-overfill opening 108 in a known manner. Although a duck-bill type check valve is depicted in the preferred embodiment shown in the Figures, other one-way or check valves known to those skilled in the art, such as a ball check valve, may also be used. The overflow relief channel 102 at its outlet end 170 merges with the waste water channel 96 to permit air and excess purified water to empty to drain in the event of overfilling of the storage jug 18. The raised mounting projection 112 on the storage jug 18 in the upper rear wall 32 prevents siphoning of the purified water out of the jug to drain from occurring.

As depicted in FIGS. 6–13, the fluid flow control manifold body 84 is a complex, one-piece molding which is preferably molded from a SANTOPRENE® type modified thermoplastic elastomer having good frictional affinity characteristics for the filter module elements 74 and other hose elements 78, 80, 110, 120, 122, 140, etc. required for making necessary fluid flow connections within the system. The lid seal member 114 is adapted to be telescopically received within a stepped shoulder region or groove 116 defined in the upper end portion 118 of the manifold body 84. A pair of depending gripping elements 172, 174 are provided adapted to be received on partition 176 between the purified or treated water channel 86 and the waste water channel 96 within the manifold 82. With the lid seal 114 in place, the lid seal 114 is welded to the manifold body 84 for use to seal off the upper portion 118 of manifold 84 to maintain a separation between the purified-water channel 86 and the waste water channel 96 as shown in FIG. 13.

In accordance with an alternate embodiment depicted in FIGS. 14 and 15, the water treatment subassembly 200 may be connected to and from a source of household tap water and a household drain by more conventional tubing means and NPT polytubing connectors. In accordance with this alternate embodiment, a twin tubing connector 202 with a dual diverter valve 204 is provided which includes a tap water inflow line 206 with an elbow connector 208 to the inlet port 64 of a granulated activated carbon filter 62. A generally U-shaped bridging connector 68 formed to right angle elbows 70, 72 is provided to convey the GAC purified output water from the GAC filter module outlet 66 to the input port 76 of the R.O. module 74. Instead of having the purified R.O. product water outlet port 78 and the waste water outlet port 80 engaged in the fluid flow control manifold 82 in accordance with the preferred embodiment, a polytubing lead 210 connects the pure-water outflow port 78 of the R.O. device 76 to a single or dual storage jug port 212 defined in the upper rear wall of the storage jug. More particularly, a T-junction polytube connection 214 is provided wherein a vertical or shaft segment of the T is received in a rubber gasket or stopper 216 which is wedgingly and press-fitted into the rear storage jug port 212 to form a sealed tube entry therein. Purified R.O. water is permitted to flow through the R.O. tubing line 210 into the lefthand segment of the T 214 and into the storage jug. The waste water outflow from the R.O. module extends by means of another polytube connection 214 to an exit T junction 220 wherein a polytubing connection is made to the waste water outflow line 222 of the twin tubing hose connector 202. An anti-overfill waste line 224 interconnects the righthand storage jug T connector 214 to the waste water exit T connector 220. An appropriate check valve in the anti-overfill line 224 should also be provided to prevent waste water from flowing into the storage jug inadvertently without passing the system drain.

In accordance with this alternate embodiment 200, more conventional polytubing connections are employed to provide a new and improved refrigerator storage jug apparatus having a water treating subassembly mounted thereto in accordance with the principles of this invention.

In accordance with this invention, the new and improved storage jug body is preferably provided as a unitary injection blow-molded storage bottle and is preferably formed from an optically translucent or transparent thermoplastic molding composition, such as a polycarbonate, polyvinyl chloride or a polyolefin molding composition. Polyvinyl chloride molding compositions are especially preferred because of their optical clarity and food safety. Other food grade moldable thermoplastics that may be made to form impact resistant, optically translucent, shaped articles may also be substituted. The rear cover 20 is preferably formed by known injection molding or vacuum form molding from a thermoplastic molding composition, such as a styrenic or olefinic resin molding composition.

Although the present invention has been defined with reference to certain preferred embodiments, modifications or changes may be made therein by those skilled in this art. For example, instead of employing a dual diverter valve and twin tubing hose connection as the means for connecting the water treating subassembly to a source of tap water and a system drain, another conventional attachment means for water treating apparatus may be used. Instead of employing adhesively bonded strips of cooperating hook-and-loop fasteners as the releasable mounting means for mounting the water treating subassembly on to the rear surface of the storage jug, other mounting means may also be employed. All such obvious modifications may be made herein by those skilled in this art without departing from the scope and spirit of this invention as defined by the appended claims.

I claim:

1. A flow control manifold for making fluid flow connections between a product water storage vessel and an output side of a water treating system, said flow control manifold comprising:

an integral unitary manifold body including a product water channel having an inlet end and an outlet end, said outlet end of said product water channel being disposed in fluid flow relation with a product water storage vessel, said manifold body further including a waste water channel having an inlet end, an outlet end and an overflow relief channel branching from said waste water channel at a point intermediate the length thereof, said overflow relief channel including an overflow inlet end disposed in fluid flow relation with said product water storage vessel and check valve means for preventing waste water entering said waste water channel from said water treating system from entering said overflow relief channel, means for connecting product water output produced in said water treating system to the inlet end of said product water channel, means for connecting waste water output of said water treating system to the inlet end of said waste water channel, means for connecting the outlet end of the waste water channel to drain and means for mounting said flow control manifold to said product water storage vessel.

2. A fluid flow control manifold as defined in claim 1, wherein said means for mounting the flow control manifold to the storage vessel comprises shaped ports projecting from a major surface of said manifold body adapted to be sealably engaged and received in corresponding apertures in said storage vessel.

3. A fluid flow control manifold as defined in claim 2, wherein said shaped ports are sealably engaged in said corresponding storage vessel apertures by interference fit.

4. A fluid flow control manifold as defined in claim 1, wherein said manifold body comprises a moldable thermoplastic elastomer composition.

5. A fluid flow control manifold as defined in claim 1, wherein said manifold body comprises a rubberized polypropylene blend composition.

6. A fluid flow control manifold as defined in claim 1, wherein said means for connecting comprise respective inlet ends in said product water channel and waste water channel which are configured for making a press-fit sealed engagement with said product water output and waste water output of said water treating system, respectively.

7. A flow control manifold for making fluid flow connections between a product water storage vessel and an output side of a water treating system, said flow control manifold comprising:

an integral unitary manifold body including a product water channel having an inlet end and an outlet end, said outlet end of said product water channel being disposed in fluid flow relation with a product water storage vessel, said manifold body further including a waste water channel having an inlet end, an outlet end and an overflow relief channel branching from said waste water channel at a point intermediate the length thereof, said overflow relief channel including an overflow inlet and disposed in fluid flow relation with said product water storage vessel and check valve means for preventing waste water entering said waste water channel from said water treating system from entering said overflow relief channel, means for connecting product water output produced in said water treating system to the inlet end of said product water channel, means for connecting waste water output of said water treating system to the inlet end of said waste water channel, and means for mounting said flow control manifold to said product water storage vessel.

8. A fluid flow control manifold as defined in claim 7, wherein said means for mounting the flow control manifold to the storage vessel comprises shaped ports projecting from a major surface of said manifold body adapted to be sealably engaged and received in corresponding apertures in said storage vessel.

9. A fluid flow control manifold as defined in claim 8, wherein said shaped ports are sealably engaged in said corresponding storage vessel apertures by interference fit.

10. A fluid flow control manifold as defined in claim 7, wherein said manifold body comprises a moldable thermoplastic elastomer composition.

11. A fluid flow control manifold as defined in claim 7, wherein said manifold body comprises a rubberized polypropylene blend composition.

12. A fluid flow control manifold as defined in claim 7, wherein said means for connecting comprise respective inlet ends in said product water channel and waste water channel which are configured for making a press-fit sealed engagement with said product water output and waste water output of said water treating system, respectively.

* * * * *